UNITED STATES PATENT OFFICE.

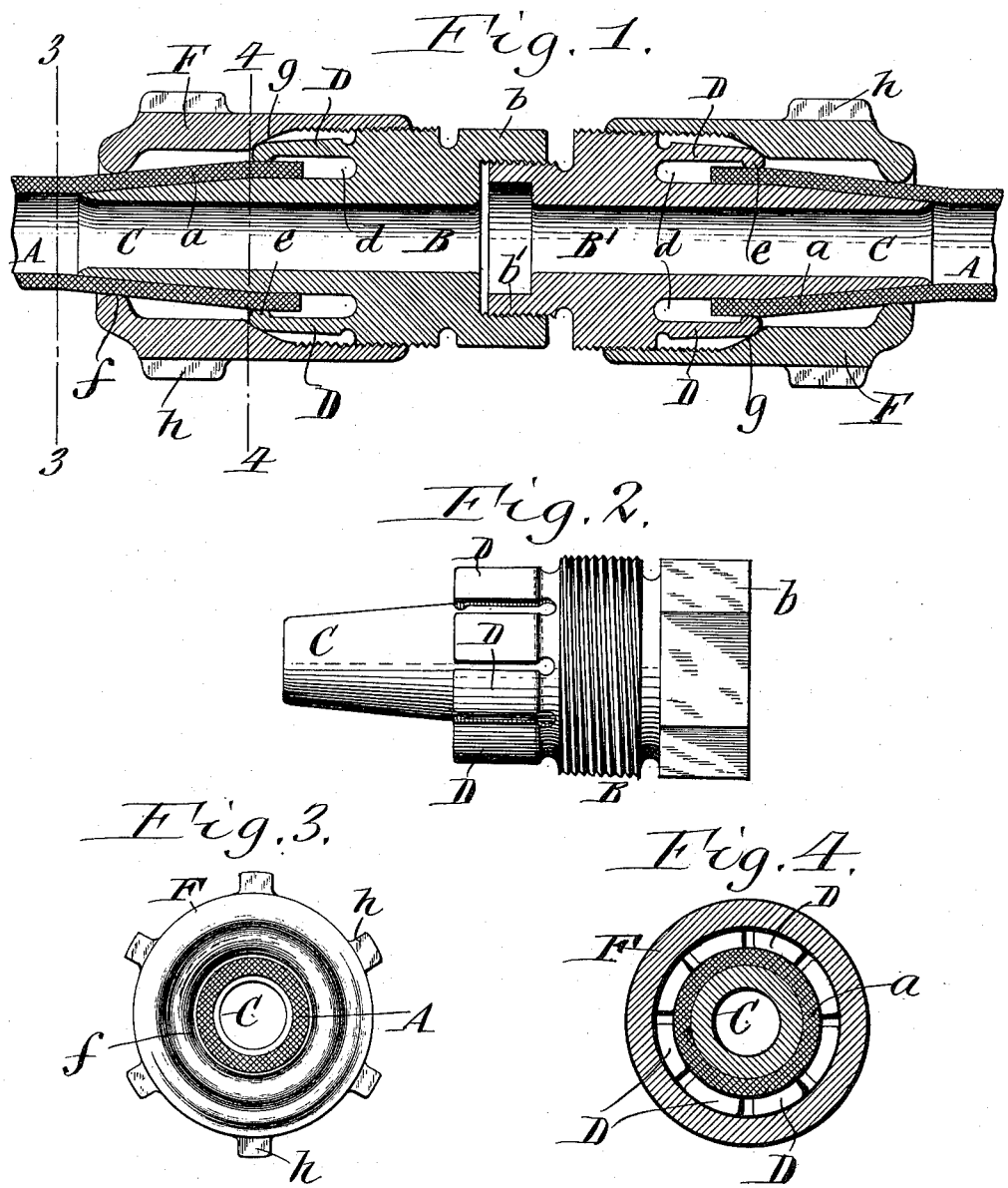
F. X. MÜLLER.
TUBE COUPLING.
APPLICATION FILED NOV. 5, 1910.
996,114.
Patented June 27, 1911.

FRANK X. MÜLLER, OF BUFFALO, NEW YORK, ASSIGNOR OF ONE-HALF TO GEORGE HOFFMAN, OF BUFFALO, NEW YORK.

TUBE-COUPLING.

996,114. Specification of Letters Patent. Patented June 27, 1911.

Application filed November 5, 1910. Serial No. 590,844.

*To all whom it may concern:*

Be it known that I, FRANK X. MÜLLER, a citizen of the United States, residing at Buffalo, in the county of Erie and State of New York, have invented new and useful Improvements in Tube-Couplings, of which the following is a specification.

This invention relates to a coupling for connecting tubes such as hose, lead pipe or the like.

It is the purpose of this invention to provide a coupling of this character whereby tubes may be easily and reliably coupled without the use of special tools for this purpose and which can be produced at comparatively low expense.

In the accompanying drawings: Figure 1 represents a longitudinal section of my improved coupling applied to the opposing ends of two tubes for connecting the same. Fig. 2 is a detached side elevation of one of the heads of the coupling and its associated nipple and clamping jaws. Figs. 3 and 4 are transverse sections on the correspondingly numbered lines in Fig. 1.

Similar letters of reference indicate corresponding parts throughout the several views.

A, A represent the two tubes or tube sections which are connected by means of my improved coupling. These tubes may be constructed of any suitable flexible, elastic or pliable material such as woven cotton, rubber or lead. In the coupled condition of each of these tubes the end thereof is flared or of conical form, as shown at $a$.

In its general organization this tube coupling comprises two coupling heads B, B¹ which are adapted to be connected with each other and with the tubes which are to be coupled. The connection between the two coupling heads may be effected in various ways but preferably by the means shown in the drawings and which consist in providing one of the coupling heads with an internally screw threaded socket $b$ and the other with an externally threaded annular flange $b^1$ which screws into said socket.

Each of the coupling heads is provided at its rear end with a nipple C which has a rearwardly tapering or conical exterior adapted to engage with the flaring or conical end of one of the tubes. Each coupling head is also provided with an annular row of longitudinal clamping jaws or tongues D which are separated from the enlarged front part of the nipple by means of an intervening annular space $d$ and each of which is connected at its front end with the rear end of the coupling head while its rear end overhangs the front end of the tube. At its rear end each jaw is provided on its inner side with an enlargement or bead $e$ which is adapted to bear against the outer side of the flaring part of the tube at the large part of the nipple. These jaws are preferably formed integrally with the coupling head and nipple and the connection between the same and the coupling head is somewhat reduced so as to permit these jaws to spring somewhat and to be pressed inwardly against the tube for clamping the same against the nipple.

Surrounding each coupling head, nipple and annular set of coupling or gripping jaws is a clamping sleeve F which has its front end adjustably connected with the respective coupling head so as to be capable of lengthwise movement thereon, this connection being preferably formed by providing the clamping sleeve at its front end with an internal screw thread which engages with an external screw thread on the front end of the respective coupling head, as shown in the drawings. At its rear end the clamping sleeve is provided with an internal annular bearing rib or bead $f$ which is rounded in cross section and is adapted to engage with the exterior of the flaring part of the tube at the small end of the nipple. Upon tightening the clamping sleeve by turning the same, so that it moves forwardly its bead $f$ moves forwardly and engages the outer side of the flared part of the tube, so that the latter is firmly clamped or gripped between the bead $f$ and the rear part of the nipple. At the same time that the bead of the clamping sleeve bears against the tube the clamping jaws are simultaneously pressed inwardly against the front end of the flared part of the tube, this being preferably effected by means of a tapering face or annular incline $g$ formed on the interior of the clamping sleeve intermediate of its front and rear ends and engaging with the free rear ends of the clamping jaws, as shown in Fig. 1. By this means each tube is clamped against the nipple on two circumferential lines arranged at different points lengthwise of the tube, thereby securing a firm hold on the tube and preventing the parts of the coupling associated therewith from becoming detached under severe usage.

When the parts are dismembered the free rear ends of the jaws are separated a sufficient distance from the nipple to permit the end of the tube to be freely pushed into the same preparatory to clamping the tube on the nipple. Upon removing the clamping sleeve from the coupling head and jaws the latter owing to their resilience spring outwardly and clear the tube so that the same can be easily removed when the same becomes worn out and replaced by a new tube. The turning of the clamping sleeve may be effected by any suitable means but preferably by applying a spanner wrench to one or the other of an annular row of laterally projecting lugs *h* formed on the periphery of the clamping sleeve.

It is to be noted that this construction of tube coupling is very simple, the same contains no delicate parts which are liable to become broken during use and the same can be very easily manipulated for attaching the same to or removing the same from the tubes which are to be coupled.

I claim as my invention:

1. A tube coupling comprising a coupling head having a nipple provided on its rear end with a tapering outer side which is adapted to engage with the inner side of the flared end of a tube and also provided with a plurality of spring clamping jaws which are arranged in an annular row around said nipple and are connected at their front ends with said head while their rear ends are free and adapted to bear against the exterior of the tube at the large part of the nipple, and a clamping sleeve surrounding the nipple and clamping jaws and connected at its front end by a screw joint with the head and adapted to bear at its rear end against the exterior of the tube at the small part of the nipple while its intermediate part bears against the rear ends of said jaws.

2. A tube coupling comprising a coupling head having a nipple provided on its rear end with a tapering outer side which is adapted to engage with the inner side of the flared end of a tube and also provided with a plurality of spring clamping jaws which are arranged in an annular row around said nipple and are connected at their front ends with said head while their rear ends are free and each provided on its inner side with an inwardly projecting bead adapted to bear against the exterior of the tube at the large part of the nipple, and a clamping sleeve surrounding the nipple and clamping jaws and connected at its front end by a screw joint with the head and provided at its rear end with an internal annular bead adapted to bear against the exterior of said tube at the small end of the nipple and provided intermediate of its ends with an internal tapering face which is adapted to bear against the rear ends of the clamping jaws and press the same inwardly against the tube.

Witness my hand this 2nd day of November, 1910.

FRANK X. MÜLLER.

Witnesses:
GEORGE HOFFMANN,
THEO. L. POPP.